No. 617,448. Patented Jan. 10, 1899.
H. W. ROBY.
BICYCLE SUPPORT OR REST.
(Application filed Aug. 12, 1897.)
(No Model.)
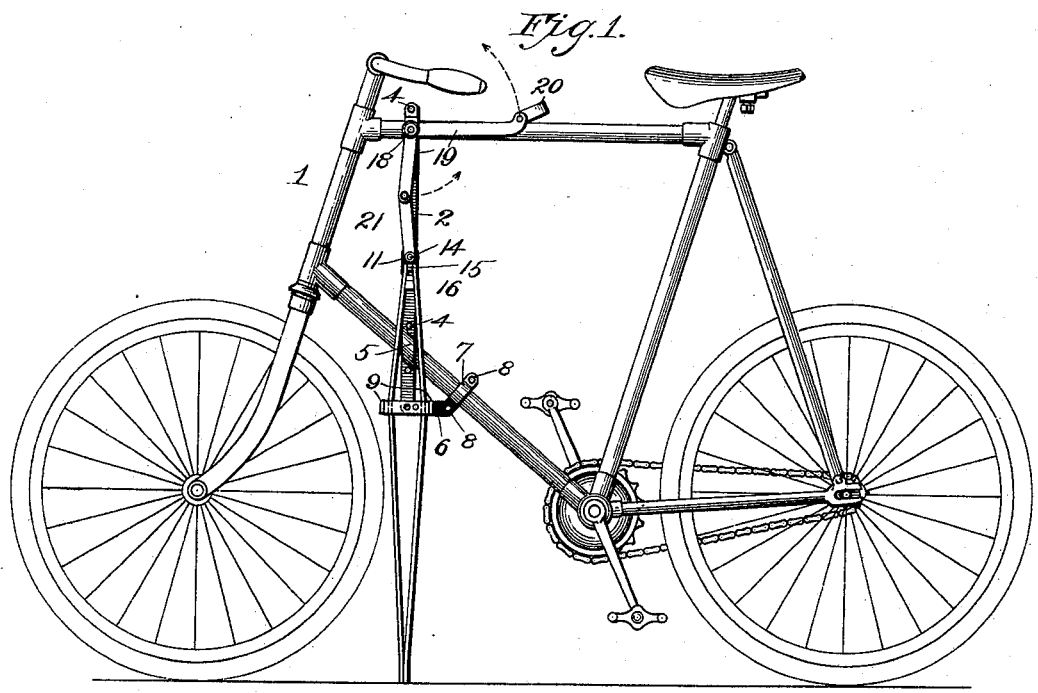
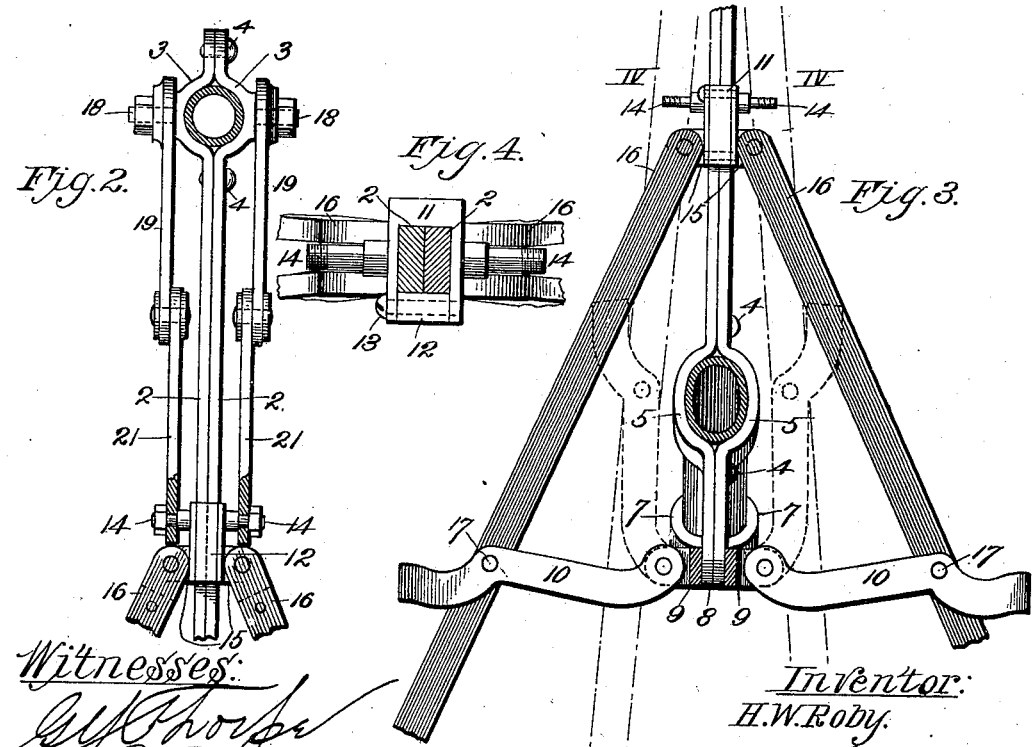
Witnesses:
Inventor:
H. W. Roby.
By Higdon & Higdon,
attys.

UNITED STATES PATENT OFFICE.

HENRY W. ROBY, OF TOPEKA, KANSAS, ASSIGNOR OF ONE-HALF TO L. L. ROBY, OF SAME PLACE.

BICYCLE SUPPORT OR REST.

SPECIFICATION forming part of Letters Patent No. 617,448, dated January 10, 1899.

Application filed August 12, 1897. Serial No. 648,071. (No model.)

*To all whom it may concern:*

Be it known that I, HENRY W. ROBY, a citizen of the United States, residing at Topeka, Shawnee county, Kansas, have invented certain new and useful Improvements in Bicycle Supports or Rests, of which the following is a full, clear, and exact description, reference being had to the accompanying drawings, forming a part thereof.

My invention relates to bicycle supports or rests, and more particularly to that class which may be thrown to operative or inoperative position by the rider when in the saddle; and my object is to produce a support or rest of this character which may be easily and inexpensively applied to a "wheel" and is of simple, economical, and durable construction.

To this end the invention consists in certain novel and peculiar features of construction and combinations of parts, as will be hereinafter described and claimed; and in order that the invention may be fully understood I will proceed to describe it with reference to the accompanying drawings, in which—

Figure 1 represents a side elevation of a bicycle provided with a support or rest embodying my invention. Fig. 2 represents, on an enlarged scale, a front view of the upper portion of the support or rest and in section the top part of the bicycle-frame. Fig. 3 represents, on the same scale, a front view of the lower portion of the support or rest broken away, said view being practically a continuation of Fig. 2 and showing the front inclined brace-bar of the bicycle-frame in section and also brackets forming a part of the support or rest. Fig. 4 represents, on a still greater scale, a horizontal section taken on the line IV IV of Fig. 3.

Referring to the drawings, 1 designates a bicycle of the usual construction. A vertical brace is clamped to the frame just rearward of the front wheel, comprising a pair of metallic bars 2 2, which fit against each other and are bent at suitable points around and clamped to the top and front inclined brace-bars of said frame. Near their upper ends, as shown clearly in Fig. 2, said bars are bowed outwardly at opposite points to form the semi-circular bearings 3, which snugly embrace the opposite sides of the top bar of the frame, and just above and below said bearings bolts 4 or their equivalents are employed to clamp said bearings firmly and immovably upon said bar. Near their lower ends said bars are bowed outwardly to form the elongated bearings 5, which embrace snugly the front inclined brace-bar of the bicycle-frame, and said bearings are secured rigidly to said bar by means of similar bolts 4, as shown in Figs. 1 and 3. A short distance below the bearings 5 the bars 2 are bent rearwardly at right angles, as at 6, and then upwardly and rearwardly at right angles to said front inclined brace-bar of the bicycle-frame, around which it is again bowed, as shown at 7, and to which it is again clamped rigidly by bolts 8. It will thus be seen that I have produced a rigid and immovable standard as a support for the operative parts of the support or rest. Riveted or otherwise rigidly secured to the horizontal portion 6 of said "standard," as said bars will be hereinafter always termed, are a pair of brackets 9, provided with outwardly-projecting ears at their outer ends, said bars being so secured that their ears shall be at equal distances from the center of said standard by preference.

10 designates a pair of U-shaped links, which also form steps whereby the rider may mount or dismount, as will be hereinafter explained, and said links are pivoted at their free ends to and between, preferably, the outwardly-projecting ears of the brackets 9.

Mounted slidingly upon the standard between the bearings 3 and 5 is a sleeve or collar 11, preferably of rectangular form. It is provided with a removable front piece 12, secured in position by bolts 13 in order to place it upon or remove it from the standard. At its upper end and sides it is provided with a pair of threaded pivot-pins 14 and vertically below the same with ears or lugs 15, to which are pivoted the upper ends of the legs or braces 16, said legs or braces extending vertically through the U-shaped links 10 and being pivoted to the same, as at 17, at suitable points, so that as the sleeve or collar 11 is elevated the links will be caused to swing upwardly, and when fully elevated occupy the positions shown in dotted lines, Fig. 3. When so arranged, it will be noticed that the outer ends or bridge portion of the U-shaped clips bear against the outer edges of the legs or braces 16, (shown in dotted lines in said figure in their closed or inoperative positions,) this snug folding of said links being accomplished because their outer ends are somewhat depressed with relation to the points of engagement with the legs or braces, as will be readily understood. Said links at their inner ends are also bent downwardly or depressed in order to permit the legs to be folded inward toward the standard as far as possible. By an exact proportionment of said parts said legs or braces can be folded up against the opposite sides of the frame, and consequently be entirely out of the way of the rider.

The legs or braces, as they practically have to sustain the entire weight of the bicycle and rider when in operative position, are preferably of truss form, each comprising a pair of bars which converge upward and downward from their pivotal points of connection with the links 10, as shown clearly in the drawings.

Mounted pivotally or fulcrumed upon the outwardly-projecting pins 18 of the standard at opposite sides of the top bar of the bicycle-frame are bell-crank levers 19, which are connected at their upper or rear ends by a pivoted handle or loop 20 and at their lower ends to the links 21, the latter being pivoted at their lower ends upon the pins 14, projecting from opposite sides of the sliding collar 11.

When the bicycle is at rest—that is, when supported by the support or rest—the pivotal point between the bell-crank lever and the links 21 is out of alinement with the pivotal points 18 and 14, being forward of the same in order that the weight of the bicycle and of the rider will by tending to swing said point still farther out of alinement hold the rear end of the lever reliably depressed, and consequently prevent the collapsing of the legs or braces and the consequent fall of the machine. To prevent such collapse, however, the rear end of the lever must not be depressed beyond a certain point, and I accomplish this by permitting the pivot-rod forming the connection between said lever and the loop-handle 20 to bear upon the top bar of the machine. Supposing now the rider mounts the bicycle and wishes to proceed, he simply grasps the handle 20 and swings the lever until its pivot-rod and the pivot between said lever and the link 21 reach the points of their respective arrows, as shown in Fig. 1. When this position has been assumed, the legs or braces occupy substantially the position shown in dotted lines, Fig. 3, and their lower ends are some few inches above the ground, sufficiently high to entirely clear rocks or other irregularities in the surface of the ground. At the same time he folds the support or rest he presses upon the pedals and propels the machine. When desiring to stop at any time, he "slows up" until the bicycle is nearly ready to topple over and then grasps the handle 20 and throws the lever, and consequently the legs or braces to the position, shown in Fig. 1. He may now maintain his seat or dismount and leave his bicycle without any possibility of its toppling over.

To prevent unauthorized persons from riding off upon it, he may lock the lever in its depressed position by an ordinary chain and padlock, or so secure it in any other suitable or desired manner.

Having thus described the invention, what I claim as new, and desire to secure by Letters Patent, is—

A bicycle support or rest, comprising a standard composed of two bars clamped together and upon the front portion of the bicycle-frame, and provided near their upper ends with outwardly-projecting trunnions, and at their lower ends with outwardly-projecting ears or lugs, a sliding non-rotatable sleeve mounted upon said standard between said trunnions and ears or lugs, an operating-lever of bell-crank form pivotally mounted upon said trunnions and toggle-jointed to said sliding sleeve, a pair of legs or braces pivoted at their upper ends to said sleeve, and a pair of links pivotally connecting the ears or lugs of the standards with said legs or braces, substantially as shown and described.

In testimony whereof I affix my signature in the presence of two witnesses.

HENRY W. ROBY.

Witnesses:
W. S. WILSON,
OLIVER McCORMICK.